US012654528B2

(12) United States Patent
Jackson et al.

(10) Patent No.: US 12,654,528 B2
(45) Date of Patent: Jun. 16, 2026

(54) DIFFERENTIAL DRIVE SYSTEM

(71) Applicants: Britt Jackson, Santa Monica, CA (US);
Thomas Boyle, Las Vegas, NV (US);
Percy Chien, Thousand Oaks, CA (US)

(72) Inventors: Britt Jackson, Santa Monica, CA (US);
Thomas Boyle, Las Vegas, NV (US);
Percy Chien, Thousand Oaks, CA (US)

( * ) Notice: Subject to any disclaimer, the term of this
patent is extended or adjusted under 35
U.S.C. 154(b) by 583 days.

(21) Appl. No.: 18/220,011

(22) Filed: Jul. 10, 2023

(65) Prior Publication Data

US 2024/0017603 A1      Jan. 18, 2024

Related U.S. Application Data

(60) Provisional application No. 63/388,348, filed on Jul.
12, 2022.

(51) Int. Cl.
| | |
|---|---|
| *B60K 1/02* | (2006.01) |
| *B60K 17/16* | (2006.01) |
| *B60K 17/26* | (2006.01) |
| *B62J 45/413* | (2020.01) |
| *B62K 5/02* | (2013.01) |
| *B62M 6/60* | (2010.01) |

(52) U.S. Cl.
CPC .............. *B60K 1/02* (2013.01); *B60K 17/165*
(2013.01); *B60K 17/26* (2013.01); *B62M 6/60*
(2013.01); *B62J 45/413* (2020.02); *B62K 5/02*
(2013.01)

(58) Field of Classification Search
CPC ........ B60K 17/165; B60K 17/26; B60K 1/02;
B62M 6/40; B62M 6/60; B62M 6/65;
B62M 6/70
See application file for complete search history.

(56) References Cited

U.S. PATENT DOCUMENTS

| | | | | |
|---|---|---|---|---|
| 2,047,050 A | * | 7/1936 | Armington | .............. B60K 1/02 |
| | | | | 475/263 |
| 5,957,798 A | | 9/1999 | Smith, III | |
| 7,261,175 B1 | | 8/2007 | Fahmer | |
| 9,457,658 B2 | * | 10/2016 | Knoblauch | .......... B60K 17/356 |
| 9,657,822 B2 | * | 5/2017 | Park | ........................ F16H 3/005 |
| 11,192,434 B2 | * | 12/2021 | Hummel | ................ B60K 17/02 |
| 11,400,807 B2 | * | 8/2022 | Chopra | ................ B60K 17/046 |
| 11,413,949 B2 | * | 8/2022 | Yang | ...................... B60K 17/16 |
| 2005/0023885 A1 | * | 2/2005 | Bennett | .................... B60K 6/48 |
| | | | | 301/124.1 |

(Continued)

FOREIGN PATENT DOCUMENTS

| | | | |
|---|---|---|---|
| CN | 202011325 | | 10/2011 |
| CN | 202011325 U | * | 10/2011 |

(Continued)

*Primary Examiner* — Emma K Frick
(74) *Attorney, Agent, or Firm* — AGK Patent &
Trademark Law; Philip Y Kim

(57) ABSTRACT

A differential drive system uses mass produced components
to create a multi-speed, automatic transmission like opera-
tion while still taking advantage of the economies of scale.
The differential drive system couples two motors to a
differential through freewheels allowing the most efficient
motor use. A pedal chain sprocket is connected to the
differential through a mid axle and through a freewheel
allowing the pedals to drive both rear axles.

15 Claims, 6 Drawing Sheets

(56)          References Cited

U.S. PATENT DOCUMENTS

| | | | | |
|---|---|---|---|---|
| 2014/0332301 | A1* | 11/2014 | Knoblauch | ............ B60K 17/35 |
| | | | | 180/65.6 |
| 2014/0335995 | A1 | 11/2014 | Global | |
| 2015/0306955 | A1 | 10/2015 | Knoblauch | |
| 2023/0356600 | A1* | 11/2023 | Matsuoka | ....... B60W 30/18036 |

FOREIGN PATENT DOCUMENTS

| | | | | | |
|---|---|---|---|---|---|
| CN | 109866613 | A | * | 6/2019 | ............. B60K 17/16 |
| CN | 114056071 | A | * | 2/2022 | ........... F16H 37/065 |
| CN | 115593206 | A | * | 1/2023 | ............... B60K 1/02 |
| CN | 116278688 | A | * | 6/2023 | ............... B60K 1/02 |
| DE | 202017002915 | U1 | * | 7/2017 | ............... F03D 9/32 |
| DE | 102022108340 | A1 | * | 5/2022 | ............ B60K 17/16 |
| DE | 102023136340 | B3 | * | 1/2025 | ............... B60K 1/02 |
| WO | WO-2019161738 | A1 | * | 8/2019 | ............... B60K 1/02 |
| WO | WO-2022174847 | A1 | * | 8/2022 | ............... B60K 1/02 |

* cited by examiner

1

DIFFERENTIAL DRIVE SYSTEM

CROSS-REFERENCE TO RELATED APPLICATIONS

The present application claims the priority of U.S. Provisional Patent Application Ser. No. 63/388,348 filed Jul. 12, 2022, which application is incorporated in its entirety herein by reference.

BACKGROUND OF THE INVENTION

The present invention relates electric vehicle drive systems and in particular to an improved drive system benefitting from simplicity and economies of scale.

Known drive systems for three and four wheeled electric vehicles have the benefit of simplicity and economies of scale due to mass production. Unfortunately many known drive systems require expensive transmissions to provide staring torque and adequate speed. The known systems further are only capable of coupling a rider's pedals to one axle, and require external components for vehicle speed sensing and pedal speed measurements.

BRIEF SUMMARY OF THE INVENTION

The present invention addresses the above and other needs by providing a differential drive system using mass produced components to create a multi-speed, automatic transmission like operation while still taking advantage of the economies of scale. The differential drive system couples two motors to a differential through freewheels allowing the most efficient motor use. A pedal chain sprocket is connected to the differential through a mid axle and through a freewheel allowing the pedals to drive both rear axles.

In accordance with an aspect of the invention, there is provided a differential drive system not requiring external component additions for speed sensing and pedal input. Magnets may be attached to a gear in the differential drive system and a Hall effect sensor attached inside the differential drive system.

In accordance with another aspect of the invention, there is provided a differential drive system having a simple, robust, and compact gear arrangement, and a maintenance free housing for a differential and motor on a heavy cargo trike. Mid axles carry gears engaging motor gears and a differential gear. Gear ratios may be changed by changing the gears carried by the mid axles. The motors are identical reducing parts inventories.

In accordance with yet another aspect of the invention, there is provided a differential drive system including a pedal chain sprocket coupled to the differential through a freewheel. The pedal sprocket engages one of the mid axles benefitting from the rotating speed reduction of the mid axle a compared to motor speed.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

2

Figure 3:
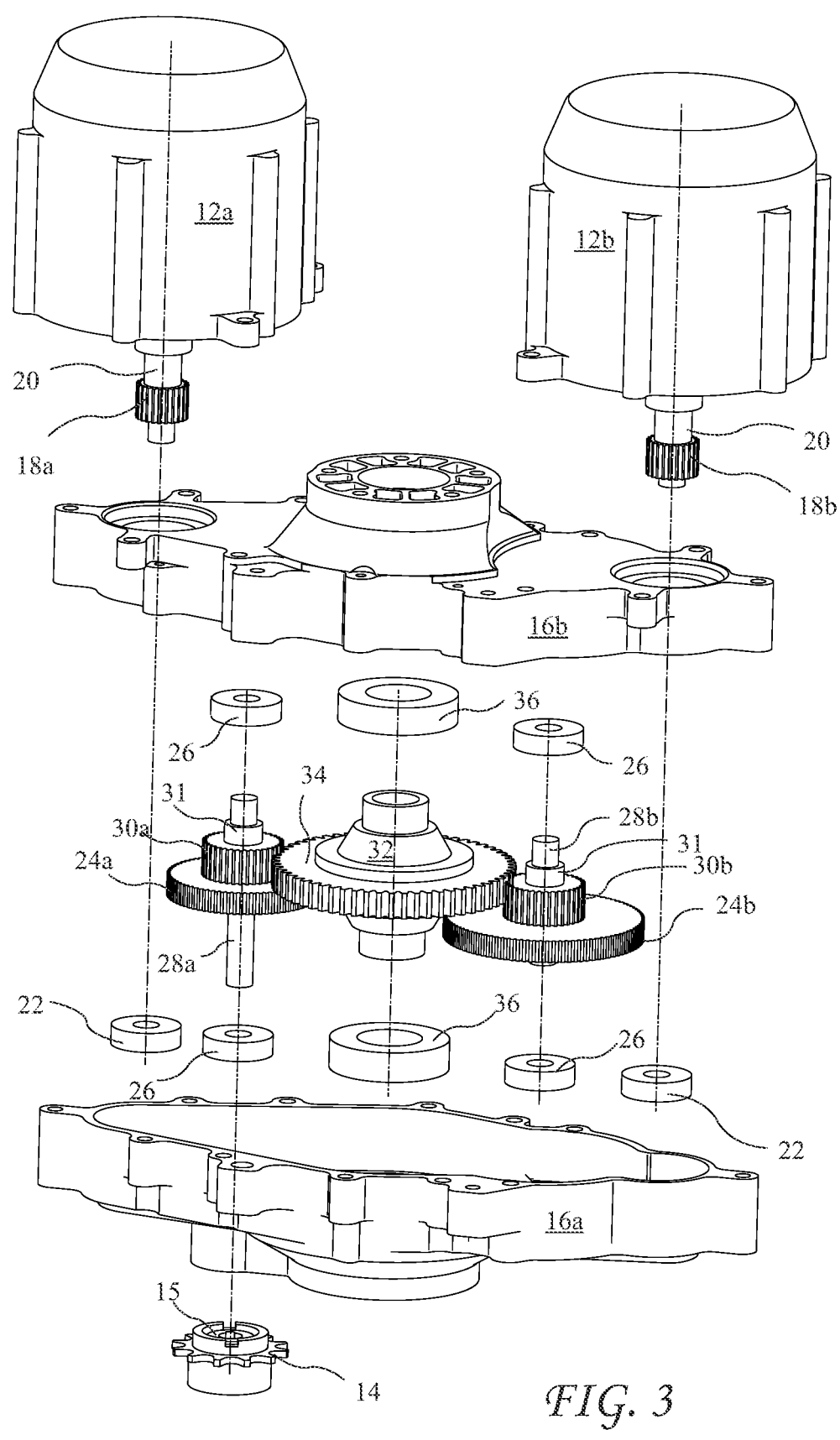

FIG. 3 shows an exploded view of the two motor differential drive system according to the present invention.

Figure 4:
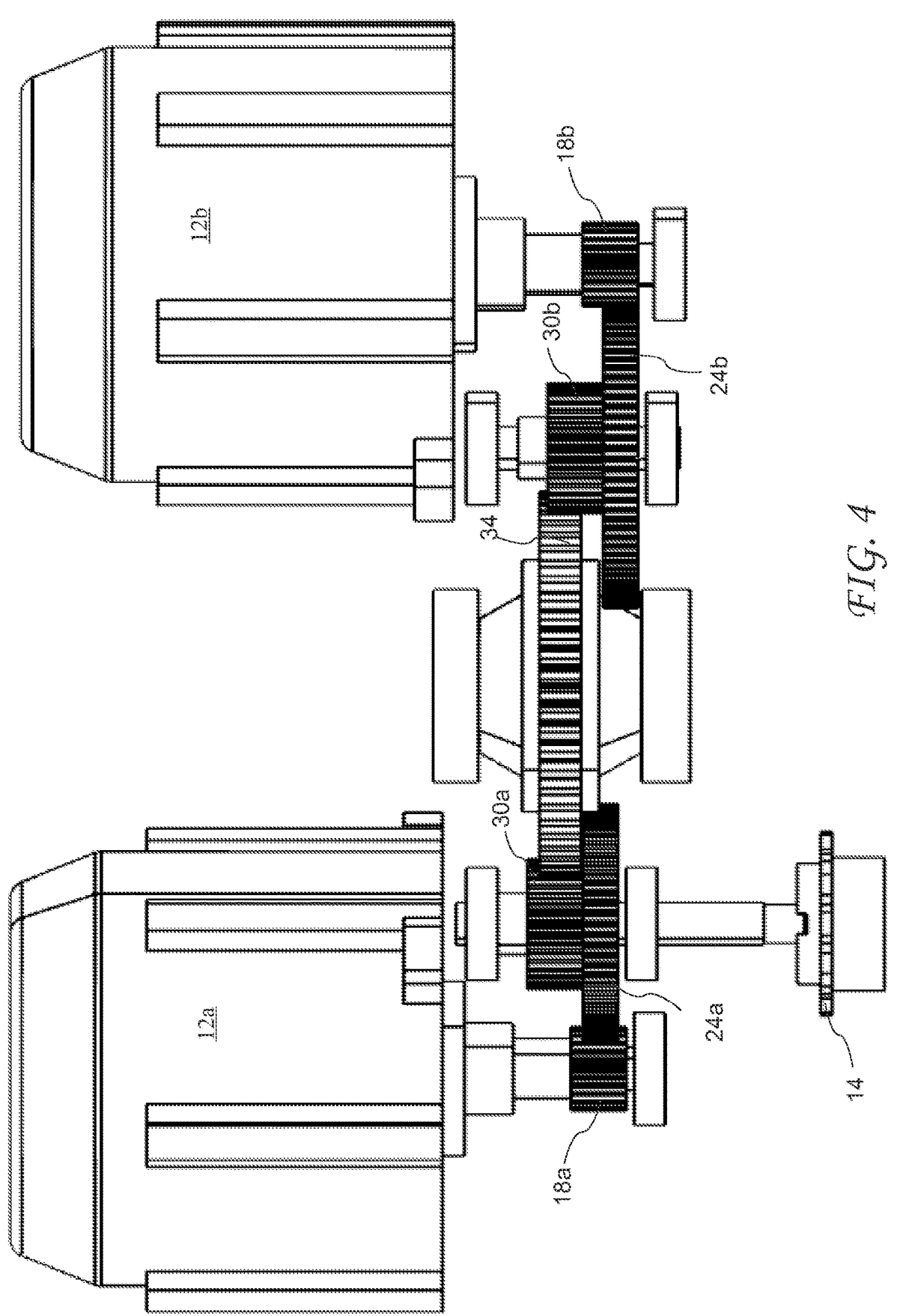

FIG. 4 shows a top view of motors and gears of the two motor differential drive system according to the present invention.

Figure 5:
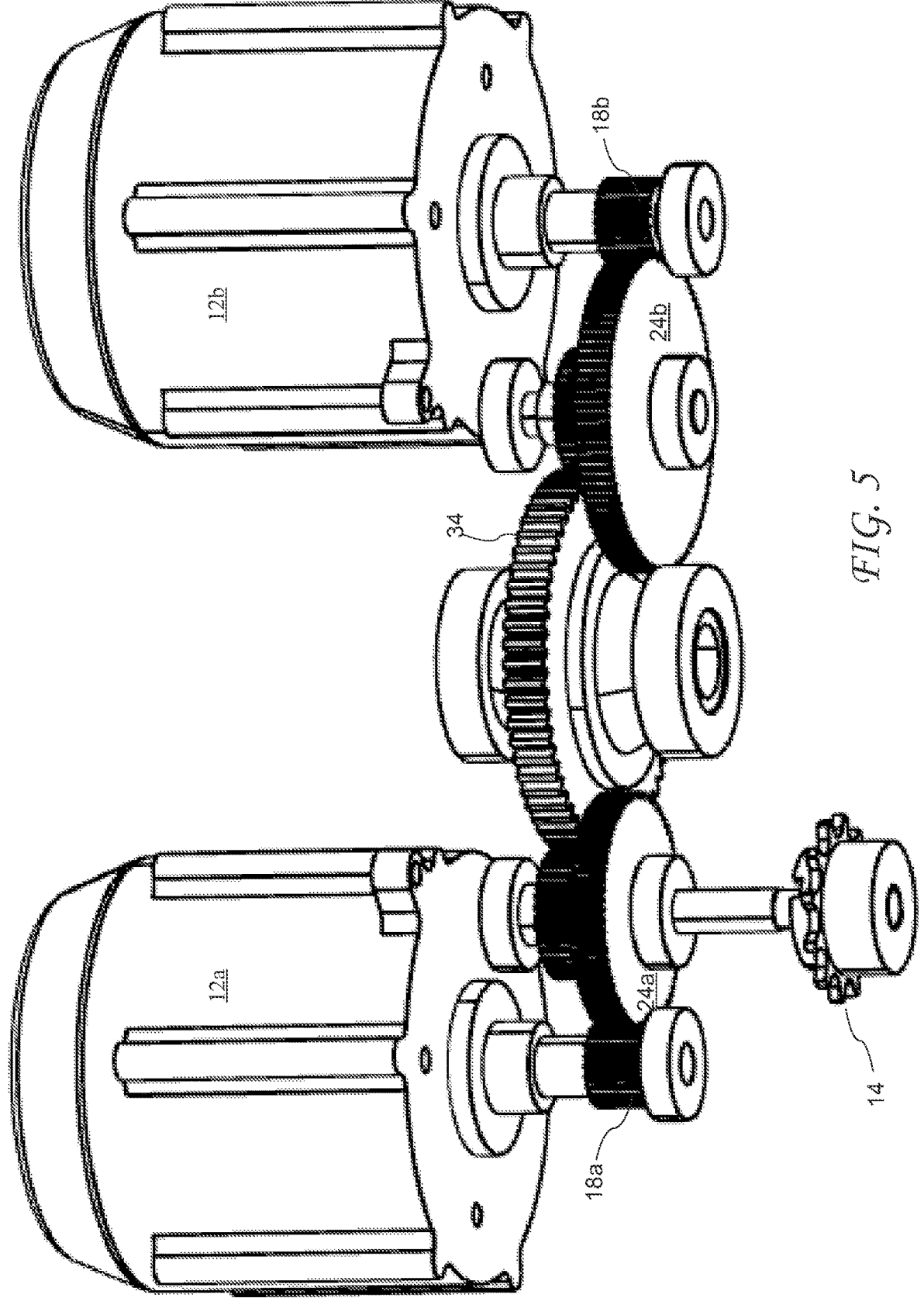

FIG. 5 shows a top and front view of motors and gears of the two motor differential drive system according to the present invention.

Figure 6:
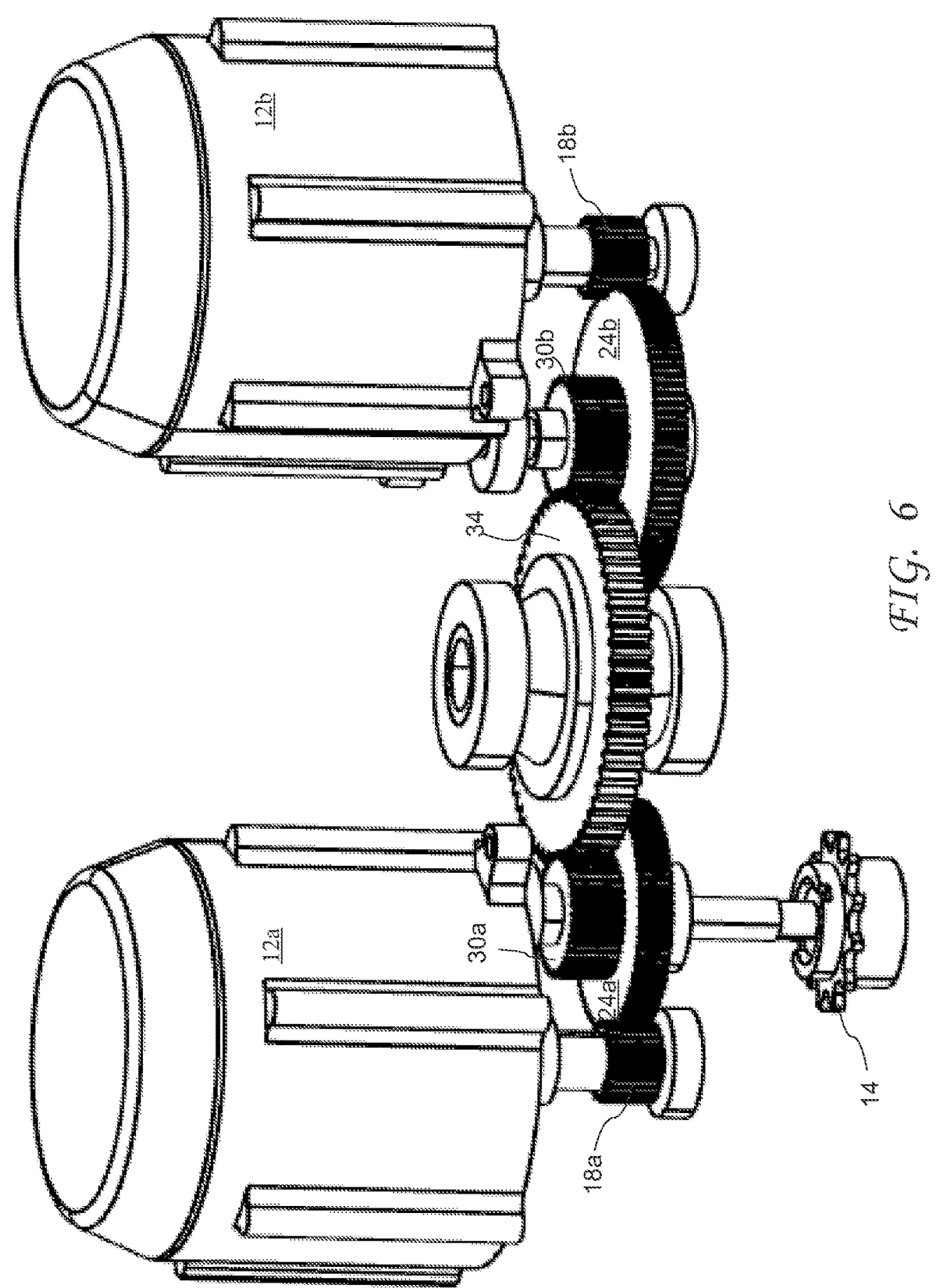

FIG. 6 shows a top an rear view of motors and gears of the two motor differential drive system according to the present invention.

Figure 7:
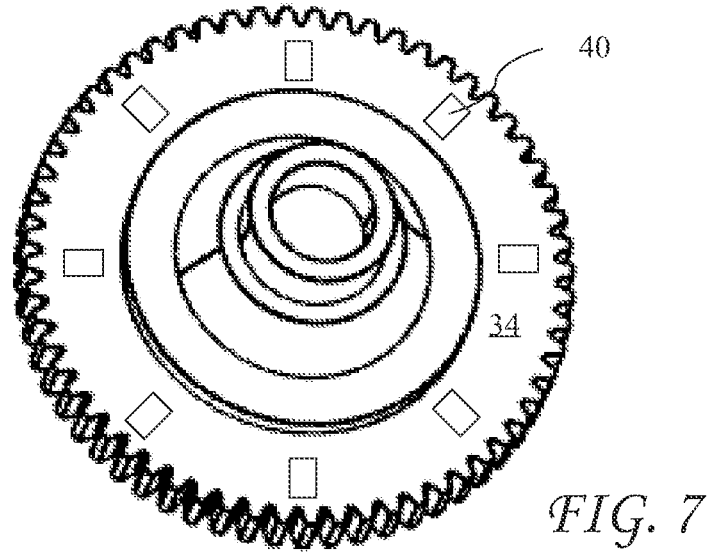

FIG. 7 shows a differential gear including magnets for a Hall effect speed sensor.

Figure 8:
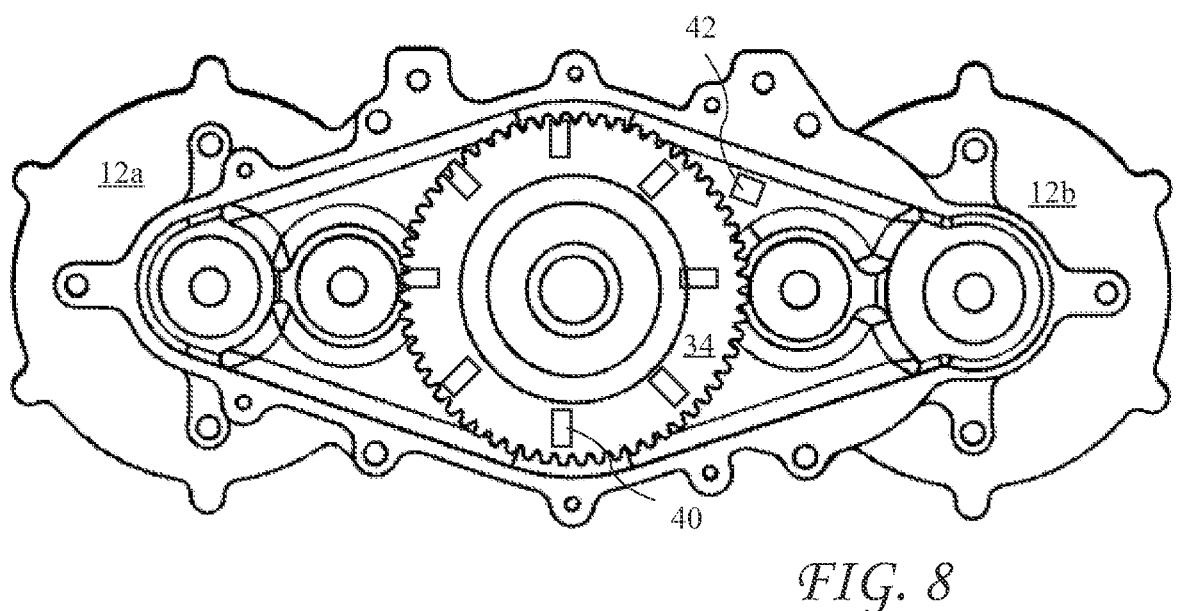

FIG. 8 shows the differential gear including magnets and the Hall effect speed sensor.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value. For example, about 30 teeth may be between 27 and 33 teeth.

Several elements are labeled "a" and "b". These elements may also be referred to as right and left. The terms right and left are not intended to be limiting, and the assembly may be rotated between the horizontal views in the drawings to a vertical view without departing from the present invention.

Figure 1:
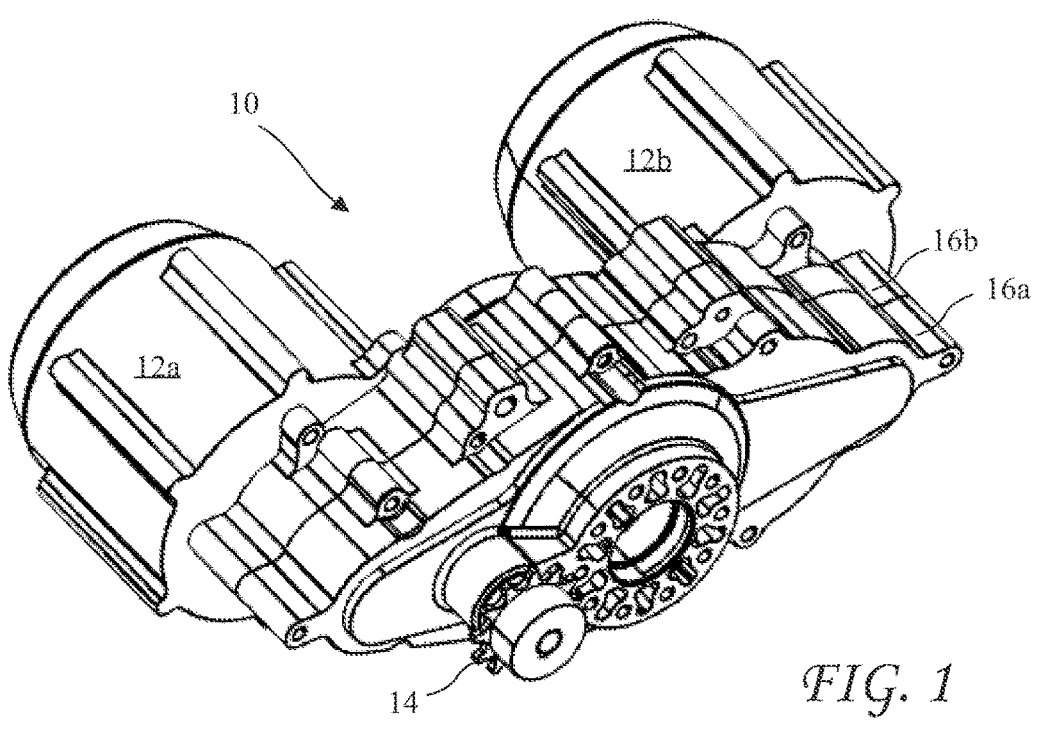
FIG. 1 shows a two motor differential drive system according to the present invention.

A two motor differential drive system 10 according to the present invention is shown in FIG. 1. The two motor differential drive system 10 includes motors 12a and 12b attached to a two piece housing 16. A pedal input sprocket 14 is connected to a mid axle 28a or 28b in the housing 16a, 16b (see FIG. 3), preferably through a freewheel 15 (see FIG. 3).

Figure 2:
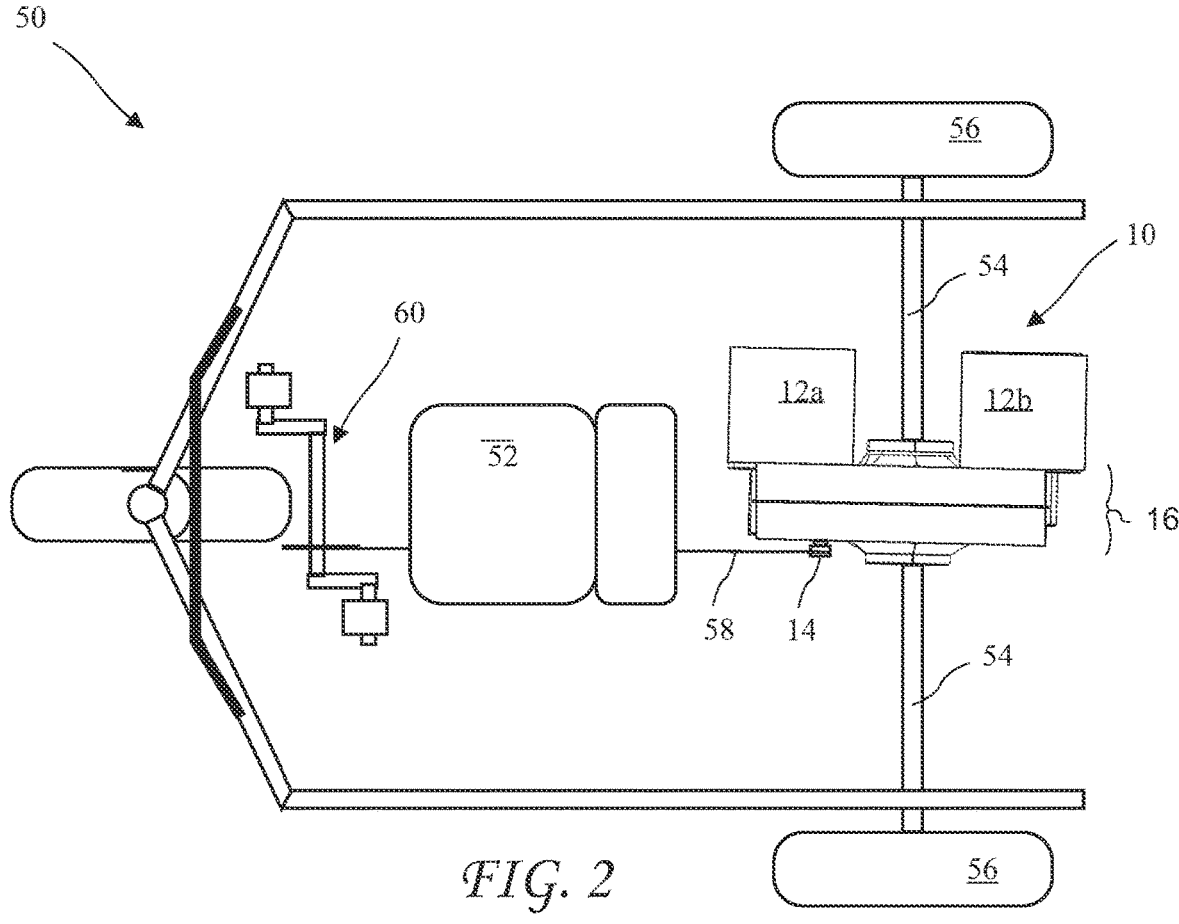
FIG. 2 shows a vehicle including the two motor differential drive system according to the present invention.

A vehicle 50 including the two motor differential drive system 10 is shown in FIG. 2. Axles 54 and right and left tires 56a and 56b are driven by the two motor differential drive system 10. Pedals 60 are positioned in front of a seat 52, and are connected by a chain 58 to the sprocket 14.

An exploded view of the two motor differential drive system 10 is shown in FIG. 3. The two motor differential drive system 10 includes the motors 12a and 12b attached to the housing side 16b of the housing 16 and motor gears 18a and 18b on motor shafts 20 extending into the housing side 16b. Ends of the motor shafts 20 are supported by bearings 22 fixed to the housing side 16a.

A first mid axle 28a is supported by mid axle bearings 26 fixed to the housing side 16a and 16b and extends out of the first housing side 16a. A second mid axle 28b resides between the housing sides 16a and 16b supported by the mid axle bearings 26 fixed to the housing side 16a and 16b. Motor mid axle gears 24a and 24b reside on mid shafts 28a and 28b and engage respective motor gears 18a and 18b. Differential mid axle gears 30a and 30b reside on the mid shafts 28a and 28b and engage a differential gear 34 on a differential 32 supported by bearings 36.

The motor mid axle gears 24a and 24b or the differential mid axle gears 30a and 30b, may engage their respective mid axle shafts 28a and 28b using mid axle freewheels (e.g., overrunning clutch or sprague clutch) 31, or the motor gears 18a and 18b may engage the motor shafts 20 through freewheels. The freewheels 31 disengage the respective motor 12a or 12b from the differential 32 then the respective motor 12a or 12b is not driving the differential 32. The freewheels 31 preferably reside couple the motor mid axle gears 24a and 24b to the mid axles 28a and 28b, allow more space for the freewheels due to a generally larger diameter of the motor mid axle gears 24a and 24b relative to the differential mid axle gears 30a and 30b.

The pedal sprocket 14 is preferably coupled to one of the mid axles 28a or 28b through a freewheel 15.

The motor gears 18a and 18b preferably have the same number of teeth and more preferably 16 teeth. The motor mid axle gears 24a and 24b preferably have about 70 teeth and more preferably have 70 teeth. The differential mid axle gears 30 preferably have about 23 teeth and preferably have 23 teeth. The differential gear 34 preferably has about 72 teeth and more preferably has 72 teeth. The housing 16a and 16b is configured to position the motor shafts 20 and the mid axles 28a and 28b apart to provide the correct engagement of the motor gears 18 and the first mid axle gears 24a and 24b. The number of teeth on the first mid axle gears 24a and 24b may be varied to vary the overall gear ratios depending on application and those skilled in the art may select low gear ratios for heavy vehicles and higher gear ratio for lighter vehicles. The two motor differential drive system 10 preferably has an overall gear ratio of about 13.7 to 1.

A top view of the motors 12a and 12b and gears of the two motor differential drive system 10 is shown in FIG. 4, a top and front view of motors 12a and 12b and gears of the two motor differential drive system is shown in FIG. 5, and a top and rear view of motors 12a and 12b and gears of the two motor differential drive system is shown in FIG. 6.

The differential gear 34 including magnets 40 for a Hall effect speed sensor 42 are shown in FIG. 7, and the differential gear 34 and a Hall effect speed sensor 42 attached to the housing 16a is shown in FIG. 8. The magnets 40 may alternatively reside on any of the gears in the differential drive system 10.

While the invention herein disclosed has been described by means of specific embodiments and applications thereof, numerous modifications and variations could be made thereto by those skilled in the art without departing from the scope of the invention set forth in the claims.

We claim:

1. An electric vehicle including a differential drive system, the vehicle comprising:
   at least three wheels including a right wheel and a left wheel;
   the right wheel and the left wheel connected to the differential drive system by a right axle and a left axle;
   the differential drive system comprising:
      housing comprising a right housing and a left housing;
      a differential inside the housing;
      a differential gear attached to the differential;
      the right and left axles connected to the differential;
      at least two motors attached to the housing;
      motor shafts of each motor reaching into the housing;
      motor gears residing on the motor shafts, the motor gears inside the housing;
      two mid axles inside the housing;

motor mid axle gears riding on the mid axles and engaging the motor gears;
      differential mid axle gears riding on the mid axles and engaging the differential gear; and
      freewheels rotationally mechanically coupling the motor shafts to the differential when the respective motor is driving the differential.

2. The vehicle of claim 1, wherein the differential drive system includes a pedal sprocket rotationally attached to one of the motor shafts, one of the mid axles, or the differential through a sprocket freewheel, the sprocket disengaging from one of the motor shafts, one of the mid axles, or the differential, when not driving the corresponding one of the motor shafts, mid axles, or the differential.

3. The vehicle of claim 1, wherein the pedal sprocket is rotationally coupled to one of the mid axles.

4. The vehicle of claim 3, wherein the pedal sprocket is rotationally coupled to one of the mid axles through a freewheel when the pedal sprocket is driving the respective one of the mid axles.

5. The vehicle of claim 1, wherein the freewheels rotationally couple the mid axles to one of the motor mid axle gears and the differential mid axle gears.

6. The vehicle of claim 5, wherein the freewheels rotationally couple the mid axle and the motor mid axle gears.

7. The vehicle of claim 1, wherein the motors, motor shafts, and motor gears are removable and replaceable without separating the right housing from the left housing.

8. The vehicle of claim 1, wherein the motors, motor shafts, and motor gears are interchangeable.

9. The vehicle of claim 1, wherein a gear ratio of the differential drive system is changeable by replacing the motor mid axle gears.

10. The vehicle of claim 1, wherein the motor gears have 16 teeth and the motor mid axle gears have 70 teeth.

11. The vehicle of claim 10, wherein the differential mid axle gears have 23 teeth and the differential gear has 72 teeth.

12. The vehicle of claim 1, wherein the differential drive system includes:
   magnets attached to at least one of the differential, motor first mid axle gears, the differential mid axle gears, and the motor gears; and
   a Hall effect sensor attached inside the housing magnetically cooperating with the magnets.

13. The vehicle of claim 12, wherein the magnets are attached to the differential.

14. An electric vehicle including a differential drive system, the vehicle comprising:
   at least three wheels including a right wheel and a left wheel;
   the right wheel and the left wheel connected to the differential drive system by a right axle and a left axle;
   the differential drive system comprising:
      housing comprising a right housing and a left housing;
      a differential inside the housing;
      a differential gear attached to the differential;
      the right and left axles connected to the differential;
      at least two motors attached to the housing;
      motor shafts of each motor reaching into the housing;
      motor gears residing on the motor shafts, the motor gears inside the housing;
      two mid axles inside the housing;
      motor mid axle gears riding on the mid axles and engaging the motor gears;
      differential mid axle gears riding on the mid axles and engaging the differential gear; and freewheels rotationally mechanically coupling the motor mid axle gears to the mid axles when the respective motor is driving the differential.

15. An electric vehicle including a differential drive system, the vehicle comprising:

at least three wheels including a right wheel and a left wheel;

the right wheel and the left wheel connected to the differential drive system by a right axle and a left axle;

the differential drive system comprising:

housing comprising a right housing and a left housing;

a differential inside the housing;

a differential gear attached to the differential;

the right and left axles connected to the differential;

at least two motors attached to the housing;

motor shafts of each motor reaching into the housing;

motor gears residing on the motor shafts, the motor gears inside the housing;

two mid axles inside the housing;

motor mid axle gears riding on the mid axles and engaging the motor gears;

differential mid axle gears riding on the mid axles and engaging the differential gear;

freewheels rotationally mechanically coupling the motor mid axle gears to the mid axles when the respective motor is driving the differential; and a pedal sprocket rotationally mechanically coupled to one of the mid axles through a freewheel when the pedal sprocket is driving the respective one of the mid axles.

\* \* \* \* \*